United States Patent

[11] 3,601,231

| [72] | Inventors | Ferdynand Kolacz;<br>Donald W. Longshore, both of New Berlin, Wis. |
|---|---|---|
| [21] | Appl. No. | 811,325 |
| [22] | Filed | Mar. 28, 1969 |
| [45] | Patented | Aug. 24, 1971 |
| [73] | Assignee | Allis-Chalmers Manufacturing Company<br>Milwaukee, Wis. |

[54] PARKING BRAKE MECHANISM
7 Claims, 6 Drawing Figs.

[52] U.S. Cl. .................................................. 188/69,
188/265, 192/4, 74/411.5, 192/3, 74/850
[51] Int. Cl. .................................................. B62c 7/02
[50] Field of Search ................................. 188/31, 69, 265

[56] References Cited
UNITED STATES PATENTS

| 2,860,731 | 11/1958 | Hause | 188/69 |
| 2,875,856 | 3/1959 | Mrlik et al. | 188/69 |
| 3,110,363 | 11/1963 | Chapman et al. | 188/69 |
| 3,116,815 | 1/1964 | Chapman | 188/265 X |
| 3,187,846 | 6/1965 | Powell | 188/69 |
| 3,213,968 | 10/1965 | Platz | 188/69 |

Primary Examiner—Benjamin W. Wyche
Attorneys—Arthur L. Nelson, Kenneth C. McKivett and Robert B. Benson

ABSTRACT: A vehicle mechanism for operating a positive parking brake and shifting a transmission which includes an interlock to prevent shifting into a driving ratio when the brake is engaged. A safety switch 34 prevents starting of the engine when the brake is released and the transmission is engaged.

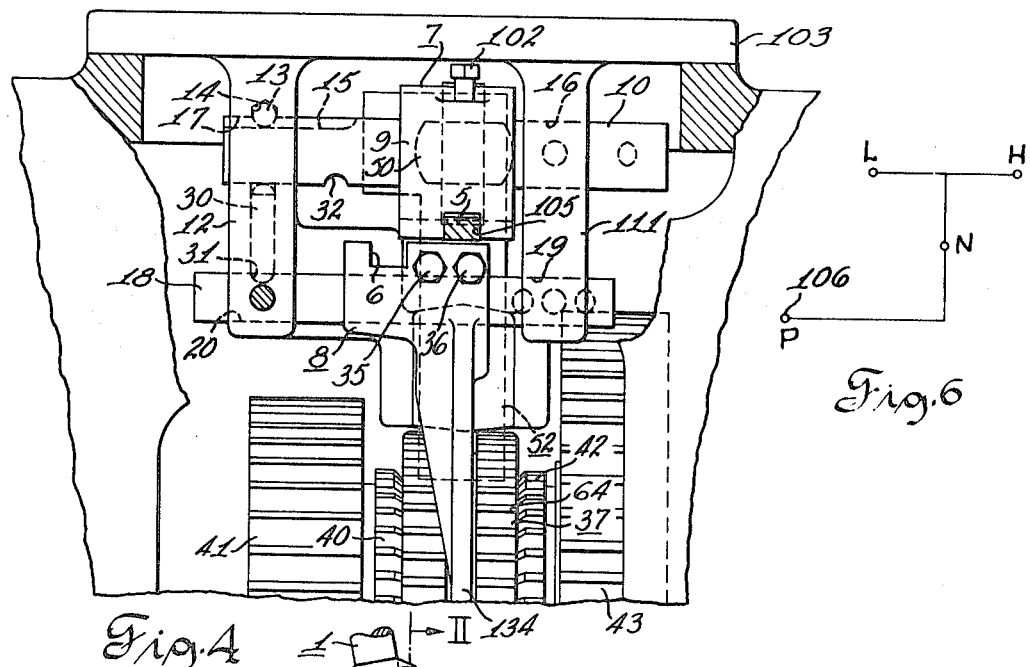
Fig. 4
Fig. 6
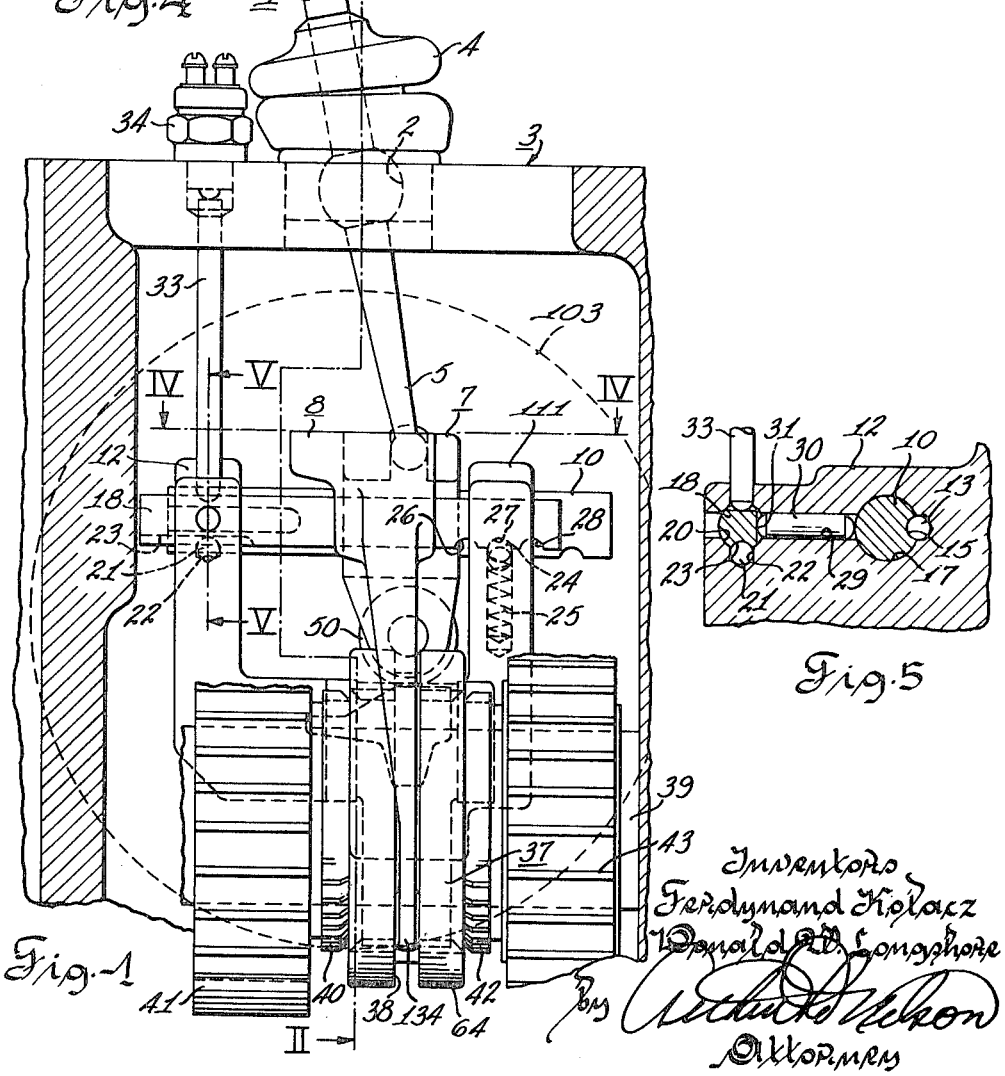
Fig. 5
Fig. 1

3,601,231

PARKING BRAKE MECHANISM

This invention relates to a parking brake and more particularly to a gear shift selector and parking brake lever controlling the positive locking of a drive shaft through a locking mechanism.

A motor vehicle requires some of a parking brake to provide a positive braking torque when the vehicle is in stationary position. The use of the engine connected through the power drive gear train or the emergency brake comprising a mechanical means of operating at least the rear wheel brakes are not entirely satisfactory in providing a positive braking action. The engine, although connected to the gear train while the clutch is engaged, will allow limited movement while the engine turns over compression in the event the incline on which the vehicle is standing is sufficiently great to overcome the compression force. The mechanical emergency brake is more satisfactory and is sometimes used on the same vehicle in which a lock employing a pawl for locking the drive shaft is also used. A positive lock on the drive shaft prevents the rotation of the drive shaft and prevents the rear wheels of the vehicle from rotating. This is the most effective means of providing a positive lock type brake.

This invention provides a gear connected to the drive shaft which is adapted for receiving a pawl means such as a gear segment to selectively engage and disengage the gear on the drive shaft to provide a positive locking means. A mechanical mechanism operated by a lever will provide a proper means of actuating and deactuating the brake.

It is the object of this invention to provide a vehicle parking brake which locks the drive shaft in a stationary position.

It is another object of this invention to provide a positive torque brake locking the drive shaft and producing a tangential locking force acting through the pivotal center of a locking pawl.

It is a further object of this invention to provide a positive drive shaft lock by means of a roller moving on a spring biased pawl lever causing engagement with a drive shaft means wherein the roller engages the pawl surface on a contact line parallel with a line defined by the movement of the roller actuator.

The objects of this invention are accomplished by providing a shift rail and a parking lock rail mounted in parallel relation to each other. A combination shift lever and park lever moves a park lock actuator parallel with the axis of rail causing a roller to climb a ramp of the pawl lever. This, in turn, pivots the pawl lever causing a gear segment on the pawl lever to move into a locking engagement with a gear carried on the drive shaft. A roller engages a contact line parallel with the axis of the park lock rail thereby positively locking the pawl in engagement with the gear carried on the drive shaft. The mechanism also includes auxiliary means for shifting gears in a transmission and operates a neutral safety switch to prevent engagement of the vehicle starter when the gears are engaged.

The preferred embodiments of this invention are illustrated in the attached drawings, wherein:

FIG. 1 illustrates a cross section view of a shift rail and park rail and a mechanism for actuating the parking brake;

FIG. 4 is a cross section view taken on line IV—IV of FIG. 1 showing the relative positions of the various parts in the mechanism;

FIG. 5 is a cross section view taken on line V—V of FIG. 1; and

FIG. 6 is a lever handle movement diagram for the shift and park lever.

Figure 2:
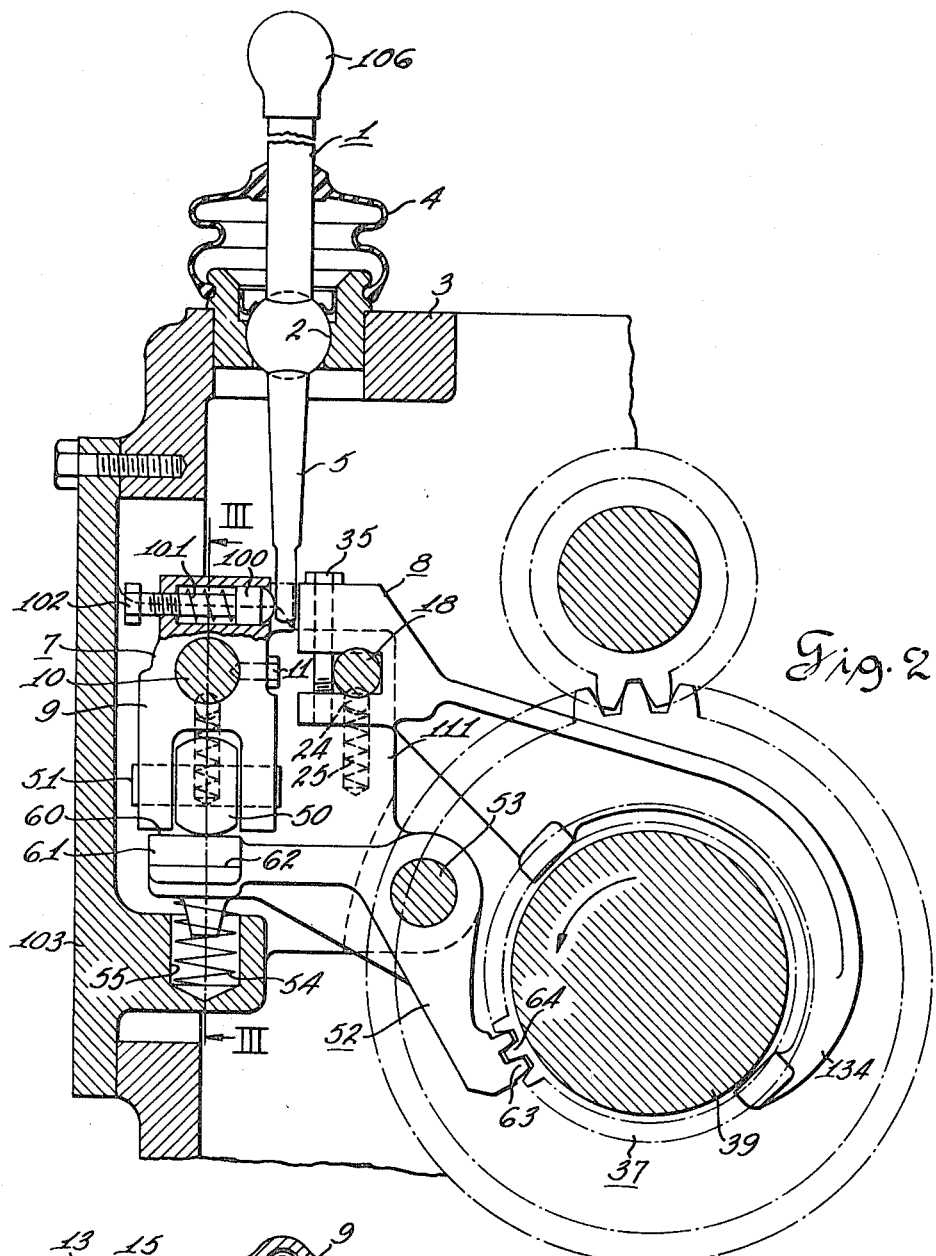
FIG. 2 illustrates a cross section view taken on line II—II of FIG. 1.

The preferred embodiments of this invention are shown in the attached drawings. Referring to the drawings, FIG. 1 shows a control lever 1 mounted in the socket 2 of a housing 3. A flexible boot 4 engages the control lever 1 and the housing 3. The actuating stem 5 extends into the housing and is received within a slot 5' in the park actuator mechanism 7 or a slot 6 in the shift mechanism 8.

The park actuating mechanism 7 includes a carrier 9 fastened to a park shift rail 10 by a bolt 11. The park shift rail 10 is slidably mounted on the vertical partition 111 and 12, within the housing 3. A guide consisting of ball 13 is seated within the recess 14 in partition 12 and extends into the groove 15 of the park shift rail 10. This guide maintains the rail 10 in a nonrotatable position while it reciprocates within the openings 16 and 17 in the partitions 111 and 12.

Similarly, the shift rail 18 is slidably mounted in the openings 19 and 20 of the partitions 111 and 12. A ball 21 is seated in the recess 22 of partition 12 and extends into the groove 23 to maintain a nonrotative position of the shift rail 18 as it is reciprocated within the openings 19 and 20. A ball 24 is spring biased by the spring 25 upwardly against the shift rail 18. The ball 24 is received within the recesses 26, 27 or 28 which define the high, neutral and low position for the shift rail 18 as it reciprocates within the openings in the partitions 111 and 12.

Referring to FIGS. 4 and 5 extending transversely in an opening 29 is an interlock pin 30 received within the recess 31 on the side of the shift rail 18, and engaging on its opposite end the side of the park shift rail 10. The shift rail 18 cannot reciprocate within the openings 19 and 20 when the interlock pin 30 is in the position as shown. The shift rail 18 may be shifted only when the end is received within the recess 32 which allows the interlock pin 30 to shift out of the recess 31 and ride along the lateral surface of the shift rail 18.

Movement of the rail 18 from the position as shown in FIGS. 1 and 4 will cause the pushrod 33 to open the neutral safety switch 34. When the shift rail 18 moves from the position shown on FIG. 1 the neutral safety switch is opened and prevents operation of the starting mechanism for the vehicle. When the neutral safety switch is closed as shown in FIG. 1, the starting mechanism can operate without danger since the shift rail 18 is positioned in neutral.

FIG. 5 also shows the interlock pin 30 in the position as shown in FIGS. 1 and 4. The park shift rail 10 and the gear shift rail 18 are shown in a position where the gear shift rail 18 is prevented from reciprocating to shift the gears.

The shift rail 18 carries a shifting fork 134 which is bolted onto the shift rail 18 by the bolts 35 and 36. Shifting fork 134 is received within an annular groove 38 on the collar 37. The collar 37 is internally splined to rotate with the drive shaft 39 which has an external mating spline. The collar 37 is shifted axially by the fork 134 to engage external spline 40 of gear 41 and the external spline 42 of gear 43. Shifting collar 37 to the right will provide low speed operation and to the left will provide high speed operation. The central position of the collar 37 is the neutral position for the transmission.

Figure 3:
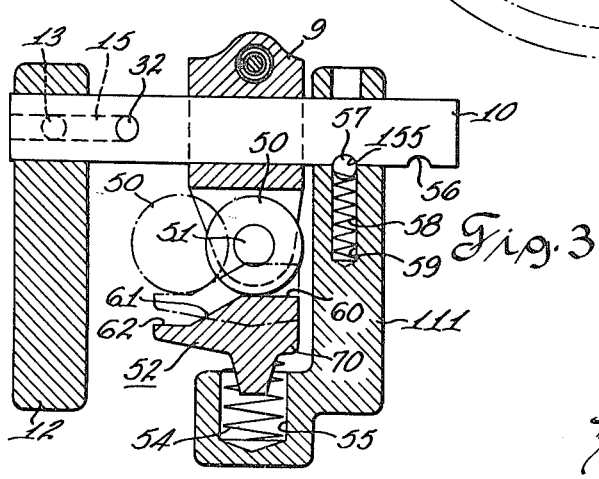
FIG. 3 is a cross section view taken on line III—III of FIG. 2.

Referring to FIGS. 2 and 3 the mechanism is shown in cross section in which the shifting fork 134 embraces the collar 37. The collar 37 encircles the drive shaft 39 and rotates with the shaft. The shift lever 1 is biased to seat in the slot 6 of the fork by plunger 100 and spring 101 carried on bolt 102.

The park lock rail 10 is slidably mounted in the partitions 111 and 12 in the housing 3. FIG. 2 illustrates the rail 10 mounted for reciprocal movement with the carriage 9. The carriage supports the roller 50 which is fastened to the carriage 9 by the pin 51. The roller 50 actuates the brake pawl lever 52. The pawl lever 52 is pivotally supported on the cross-shaft 53. The pawl lever is biased to a retracted position by means of the spring 54 which is nestled in the opening 55 of the control cover 103. The pawl lever 52 is also shown in FIG. 3 in a right angle view. The park shift rail 10 is shown supported in the partitions 111 and 12. Guide 13 received within the slot 15 maintains park rail 10 for nonrotative reciprocal movement. Detent 57 is spring biased to be received in a recess 155 or 56. The spring 58 biases the detent 57 to engage park shift rail 10 and is seated within the opening 59 in the partition 12. The roller 50 is shown in the brake operating position in which it rides on the surface 60 which is parallel to the axis of the park shift rail 10. The actuating surface 61 is inclined to the surface 60 and it turn biases the pawl lever 52 to its operating position as the roller 50 rolls up the surface 61. The surface 62 is substantially parallel with the surface 60 upon which the roller rests when the brake is in the unlocked position which is shown in phantom. The pawl lever 52 carries a gear segment 63 on the toe end of the lever which is adapted for engagement with the gear 64 on the collar 37. The teeth of gear segment 63 and gear 64 are of involute profile The tangential component of force at the pitch circle from the gear teeth 64 when the pawl lever 52 is in the operating or locked position does not result in an applied moment on the lever since the force is directed through the pivotal center of cross-shaft 53, and is not directional sensitive. This minimizes the required holding force on the roller 50. The radial component of the gear teeth 64 engaging the gear segment 63 is, however, sufficient to bias the pawl lever to a retracted and unlocked position to avoid damage in case of failure of the spring 54.

The operation of this device will be described in the following paragraphs. The control lever 1 is pivotally supported in the socket 2 and includes the stem 5 for operating the gear shift rail 18 or the park lock shift rail 10. The stem 5 will be received either within the slot 105 of the park lock carriage 9 or the slot 6 of the shifting fork 134. Its position is determined manually by the operator. The shifting of the gear shift rail 18 is accomplished by placing the stem 5 in the slot 6 and then shifting the collar 37 to the right or to the left to engage the collar with either of the splines 40 or 42 depending on which speed of operation is desired. It is understood that a friction clutch will also be used in combination with this mechanism to provide synchronization of the gears prior to shifting the shift rail 18.

A control lever 1 positions the shift rail 18 to a neutral position before it is transferred to the park lock shift rail. FIG. 6 illustrates the movement of the handle 106 in accomplishing the shifting of the gears and the actuation of the park lock. The high-low shift range must be positioned in neutral before the stem 5 is moved transversely to engage the park lock shift rail 10. The detent 24 will seat in the intermediate notch 27 as shown when the shift rail is in neutral and then the stem will move into the slot 105 in the carriage 9.

To actuate the park lock the control lever handle 106 is moved in the pattern as shown in FIG. 6 causing the carriage 9 to move with the park shift rail 10 which carries the roller 50.

The phantom view of FIG. 3 shows the roller 50 in the position where the pawl lever 52 is in the unlocked position. The roller 50 rests on a surface 62. As the lever is moved causing the carriage to move as indicated in FIG. 6, the roller climbs the incline surface 61 forcing the heel 70 of the pawl lever 52 to be depressed against the biasing force of the spring 54. The pawl lever pivots about the cross-shaft 53. Further movement of the pawl lever 52 causes the roller 50 to climb the inclined surface 61 until it rolls onto the surface 60. When the roller engages the surface 60, the pawl lever is actuated and the gear segment 63 on the toe of the lever 52 is fully engaged with the gear teeth 64 of the collar 37. The line of contact between the roller 50 on the surface 60 is parallel with the axis of the park shift rail 10. Consequently, there is no component of force biasing the pawl lever 52 to the unlocked position. The drive shaft 39 is positively locked.

When the park lock is to be disengaged the lever is moved to the neutral position of FIG. 6 which in turn will cause a return movement of the roller 50 down the incline surface 61 onto the surface 62. A spring 54 will bias the pawl lever 52 to pivot on a cross-shaft 53 and disengage the gear segment 63 on the toe of the lever from the gear teeth 64 on the collar 37. This causes a release of the drive shaft which once again is permitted to rotate freely. FIG. 6 shows the movement of the control lever which in turn will place the lever in neutral position. From the neutral position the shift lever can again be operated to shift the gears to a high or low position by moving the collar 37.

It is noted that the tangential force causing the locking of the drive shaft 39 is a force which is transmitted through the axis of the cross-shaft 53. There is no component of force causing an unlatching of the pawl lever 52 with the collar 37. The surface 60 on the heel of the pawl lever is parallel with the axis of the park shift rail and therefore no component of force will cause the lever to shift out of engagement. It is understood, however, that when the park pawl is permitted to move off surface 60 the radial component between the gear segment 63 and the gear teeth 64 becomes effective and will tend to disengage the pawl lever 52 from the collar 37. This will assist unlocking of the drive shaft in event of failure of spring 54.

The preferred embodiment of the present invention has been illustrated and described.

The embodiments of the invention in which we claim and exclusive property or privilege are defined as follows:

1. A positive drive shaft lock comprising a braking gear connected for rotation with a drive shaft, a pawl lever including a pawl arm having pawl means engaging said gear, an operating arm on said pawl lever defining an actuating ramp and a locking surface forming a plane, means defining a pivotal axis and pivotally supporting said lever between said pawl arm and said operating arm, a park shift rail defining an axis of reciprocal movement parallel with the plane of said locking surface and said pivotal axis, a park lock actuator including a carriage supported roller mounted on said park shift rail, a control means moving said carrier supported roller across said ramp and engaging said locking surface on a line of contact parallel with the axis of said rail and pivotal axis to thereby cause said pawl lever to lock the braking gear on said drive shaft.

2. A positive drive shaft lock as set forth in claim 1 including a spring engaging said pawl lever and normally biasing said pawl lever to the disengaged position and said pawl lever is manually operated to engage the pawl lever with the drive shaft gear.

3. A positive drive shaft as set forth in claim 1 including means pivotally mounting said pawl lever at a point coincidental with a tangential force produced by the locking of said braking gear and therefore eliminating any tangential component tending to unlock the pawl lever from the braking gear regardless of drive shaft rotation.

4. A positive drive shaft lock as set forth in claim 1 wherein said pawl lever includes a gear segment engaging said braking gear producing radial component tending to release the drive shaft lock in event the pawl lever does not completely pivot out of engagement with the braking ear when the actuator is released.

5. A positive drive shaft lock as set forth in claim 1 wherein said pawl lever defines a pivoting axis parallel to the axis of said park shift rail.

6. A positive drive shaft lock as set forth in claim 1 wherein said pawl means defines a gear segment having involute teeth and said braking gear defines involute gear teeth.

7. A positive drive shaft lock as set forth in claim 1 wherein said actuator includes said roller rotatably mounted on said actuator, said roller defines an arcuate cross-sectional surface rolling on said ramp of said lever to actuate said pawl lever, said roller on said actuator produces a force normal to the locking surface to lock said pawl lever.